July 28, 1942.                F. J. SHOOK ET AL                2,291,506
                              VULCANIZING PRESS
                           Filed Oct. 30, 1939              9 Sheets-Sheet 1

INVENTORS
FLORAIN J. SHOOK AND
HENNING T. TORNBERG
BY
Joseph Barrow
ATTORNEY

July 28, 1942.  F. J. SHOOK ET AL  2,291,506
VULCANIZING PRESS
Filed Oct. 30, 1939     9 Sheets-Sheet 2
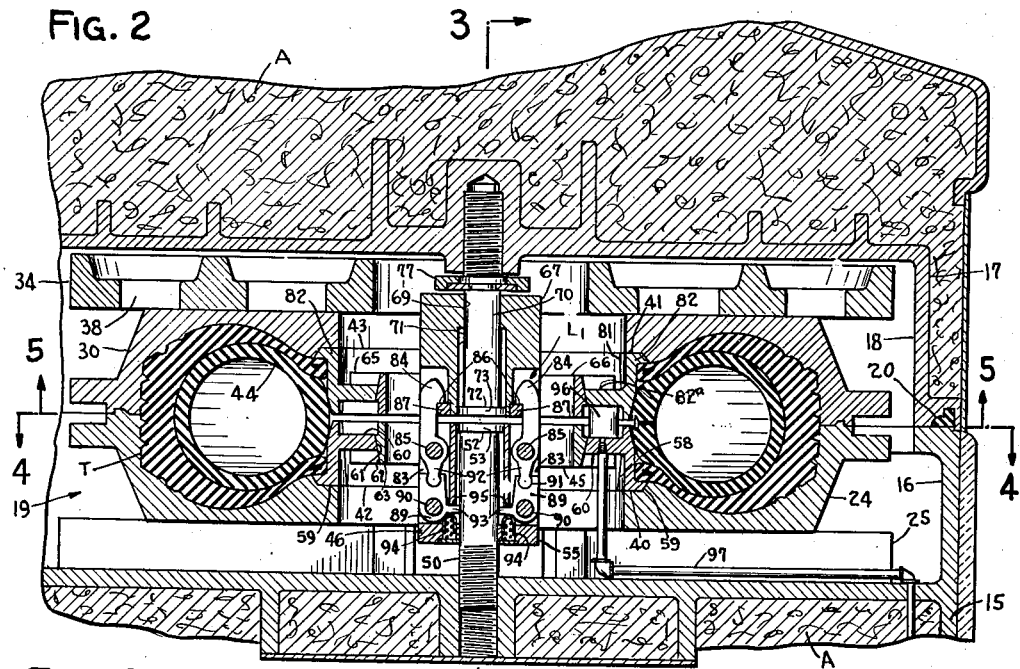
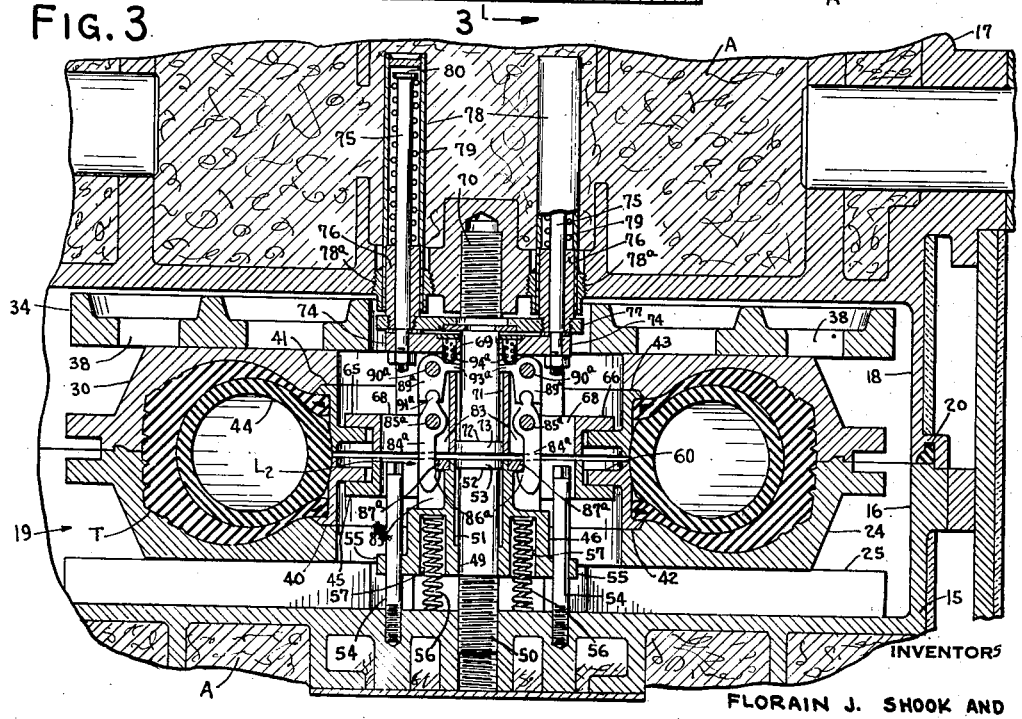
INVENTORS
FLORAIN J. SHOOK AND
HENNING T. TORNBERG
BY
Ralph Barrow
ATTORNEY

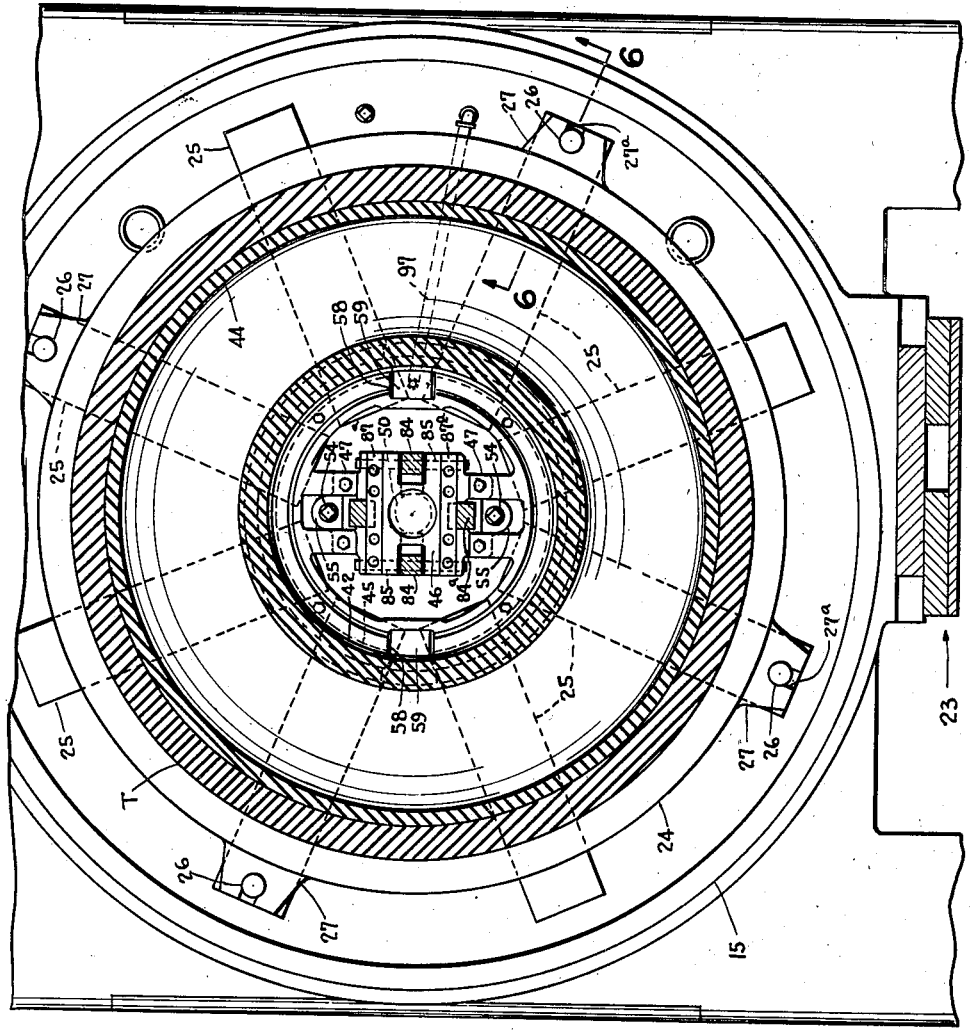

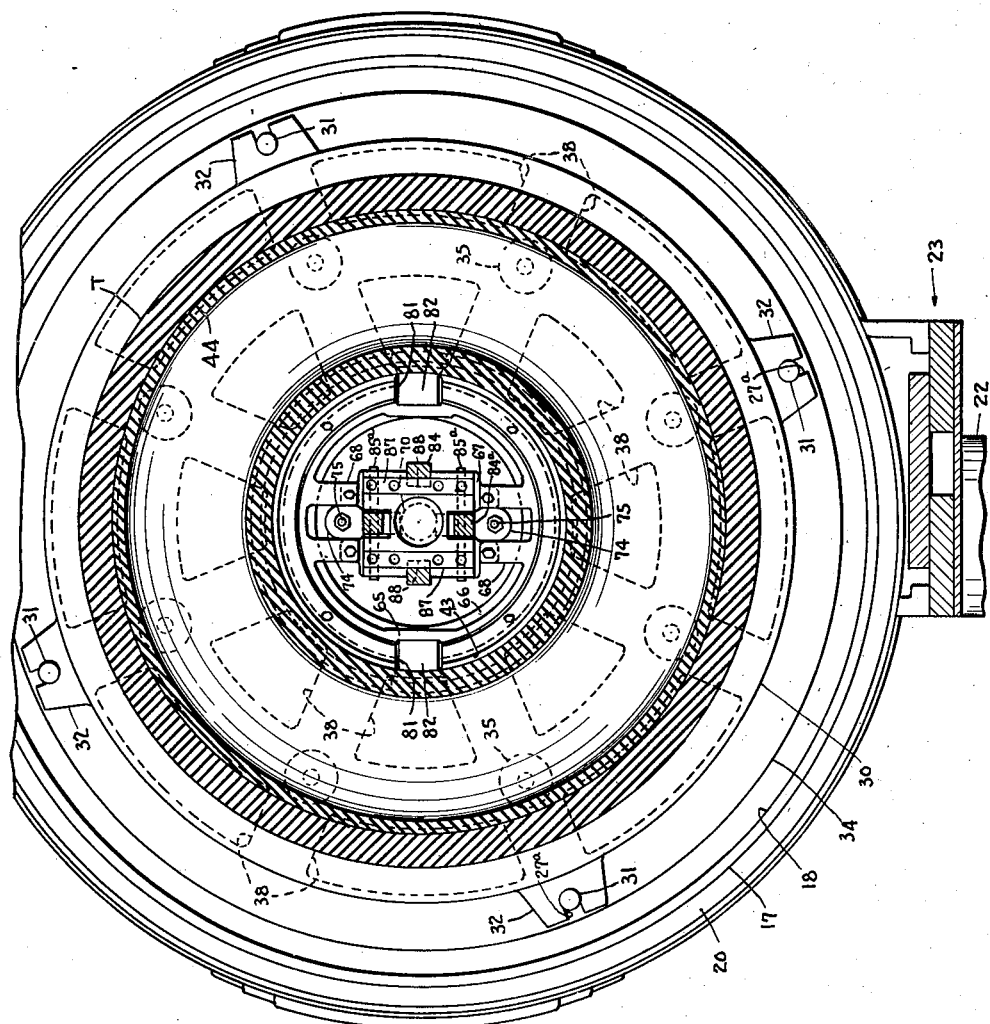

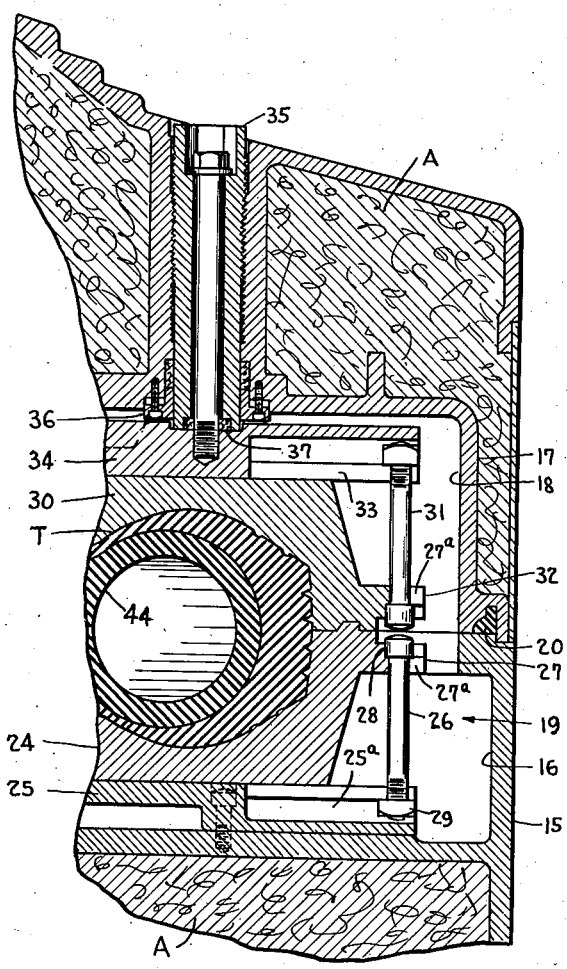

July 28, 1942.  F. J. SHOOK ET AL  2,291,506
VULCANIZING PRESS
Filed Oct. 30, 1939  9 Sheets-Sheet 6

INVENTORS
FLORAIN J. SHOOK AND
HENNING T. TORNBERG.
BY
J. Raeph Barrow
ATTORNEY

July 28, 1942.　　F. J. SHOOK ET AL　　2,291,506
VULCANIZING PRESS
Filed Oct. 30, 1939　　9 Sheets-Sheet 7

INVENTORS
FLORAIN J. SHOOK AND
HENNING T. TORNBERG
BY Ralph Barrow
ATTORNEY

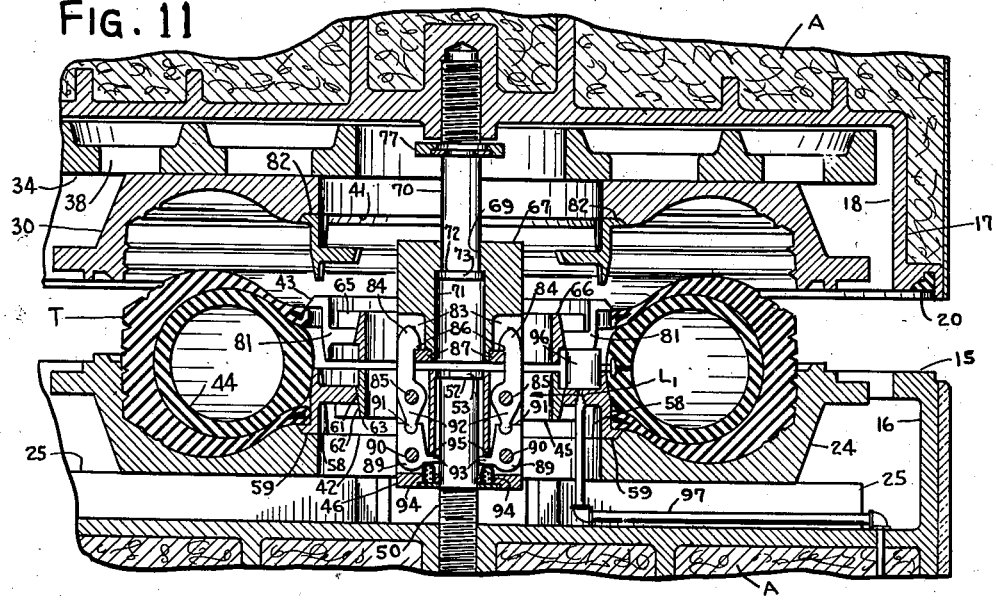
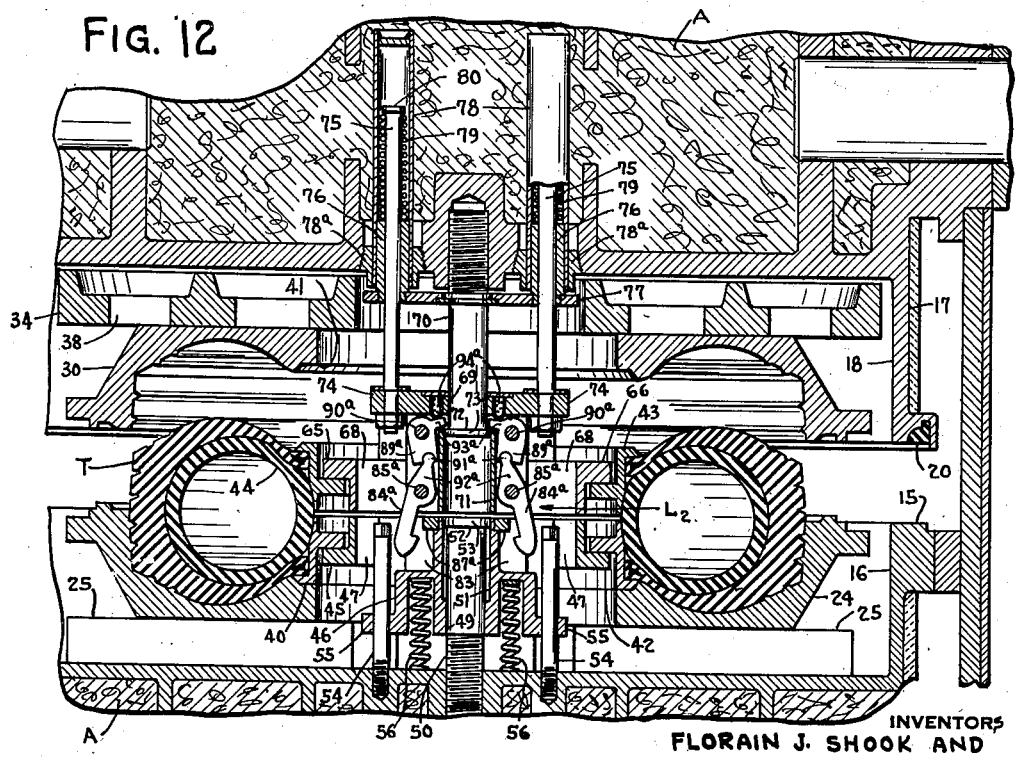

July 28, 1942.  F. J. SHOOK ET AL  2,291,506
VULCANIZING PRESS
Filed Oct. 30, 1939    9 Sheets-Sheet 9
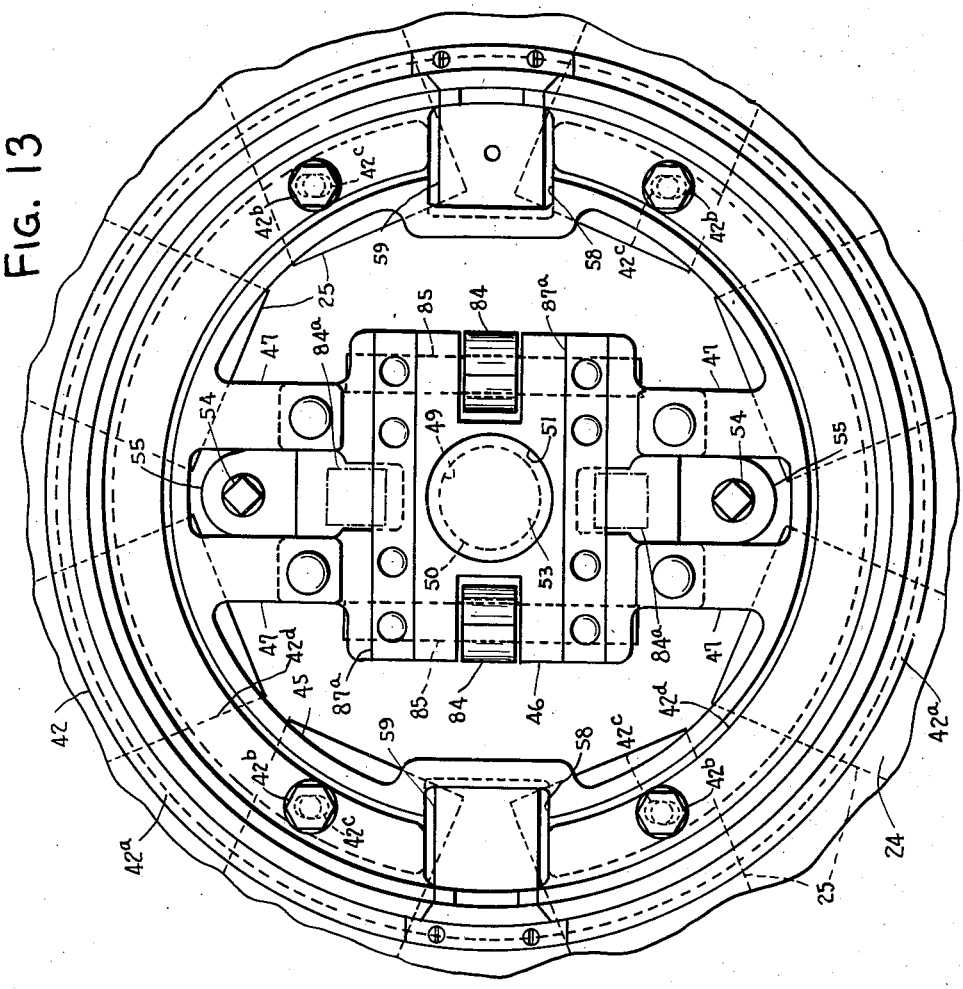
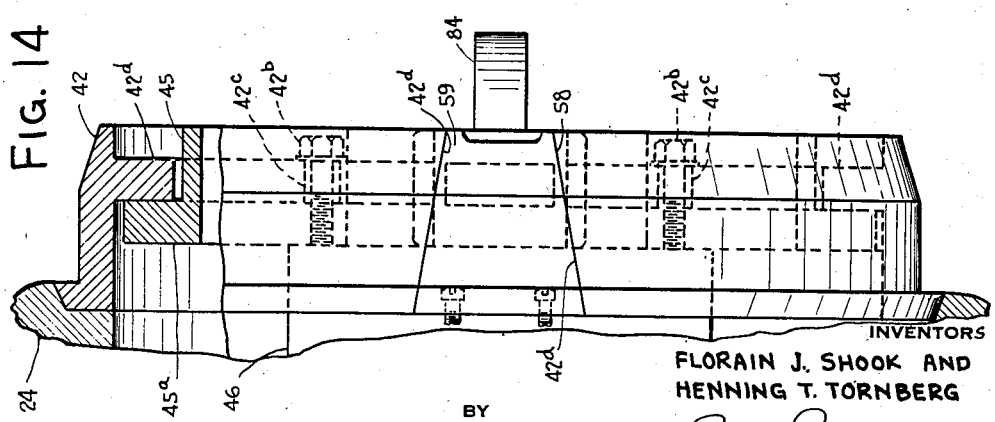
INVENTORS
FLORAIN J. SHOOK AND
HENNING T. TORNBERG
BY
Ralph Barrow,
ATTORNEY Patented July 28, 1942

2,291,506

UNITED STATES PATENT OFFICE 2,291,506

VULCANIZING PRESS

Florain J. Shook and Henning T. Tornberg, Akron, Ohio, assignors to National Rubber Machinery Company, Akron, Ohio, a corporation of Ohio Application October 30, 1939, Serial No. 301,967

16 Claims. (Cl. 18—17)

This invention relates to vulcanizing presses and in particular relates to presses for use in vulcanizing pneumatic tires.

A general object of the invention is to provide in a vulcanizing press improved self-actuating means for automatically stripping articles from the press as it is opened after the articles are vulcanized.

A particular object of the invention is to provide in a press having registering mold sections means for stripping an article from the sections, regardless of the order in which the article releases from the respective sections by breaking of the adhesion between the surfaces of the article and the sections.

Another object of the invention is to provide stripping means of the character described for automatically stripping finished articles from the press, without the necessity of applying lubricant to the surfaces of the registering mold sections to aid breaking the adhesion between the surfaces of the article and mold sections.

These and other objects of the invention will be manifest from the following brief description and the accompanying drawings.

Of the accompanying drawings:

Figure 2 is a view similar to Figure 1 showing the press members in closed position.

Figure 3 is a cross-section taken substantially on line 3—3 of Figure 2.

Figure 4 is a cross-section, partly broken away, taken substantially on line 4—4 of Figure 2.

Figure 5 is a cross-section, partly broken away, taken substantially on line 5—5 of Figure 2.

Figure 6 is a fragmentary cross-sectional view through the press members, taken substantially on line 6—6 of Figure 4.

Figure 7:
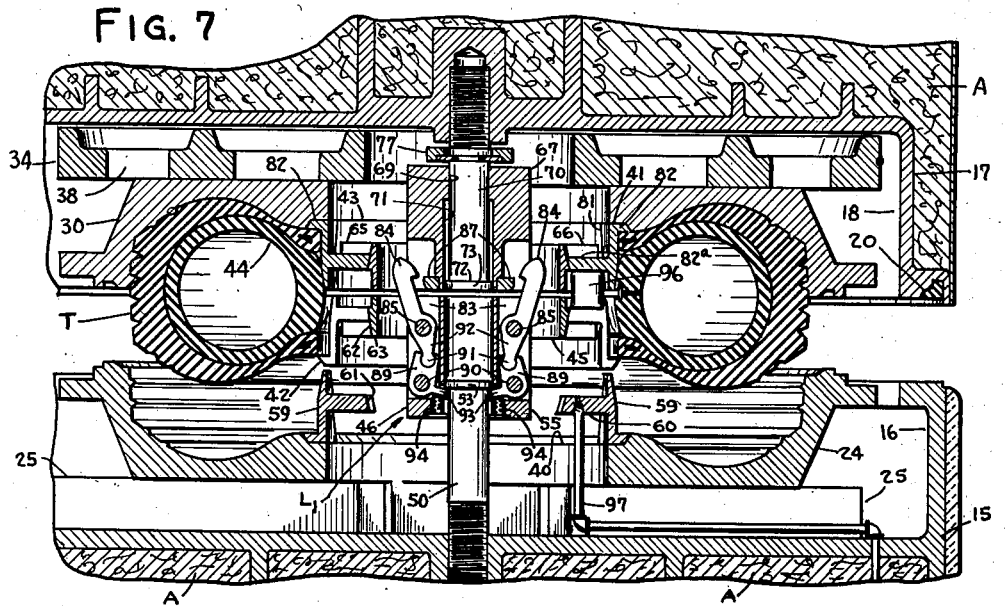
Figures 7 and 8 are views corresponding to Figures 2 and 3, respectively, illustrating the tire-stripping mechanisms in an initial stage of the press opening operation, in which the adhesion between the surfaces of the tire and the lower mold section is broken prior to the breaking of the adhesion to the upper mold section.
Figure 8:
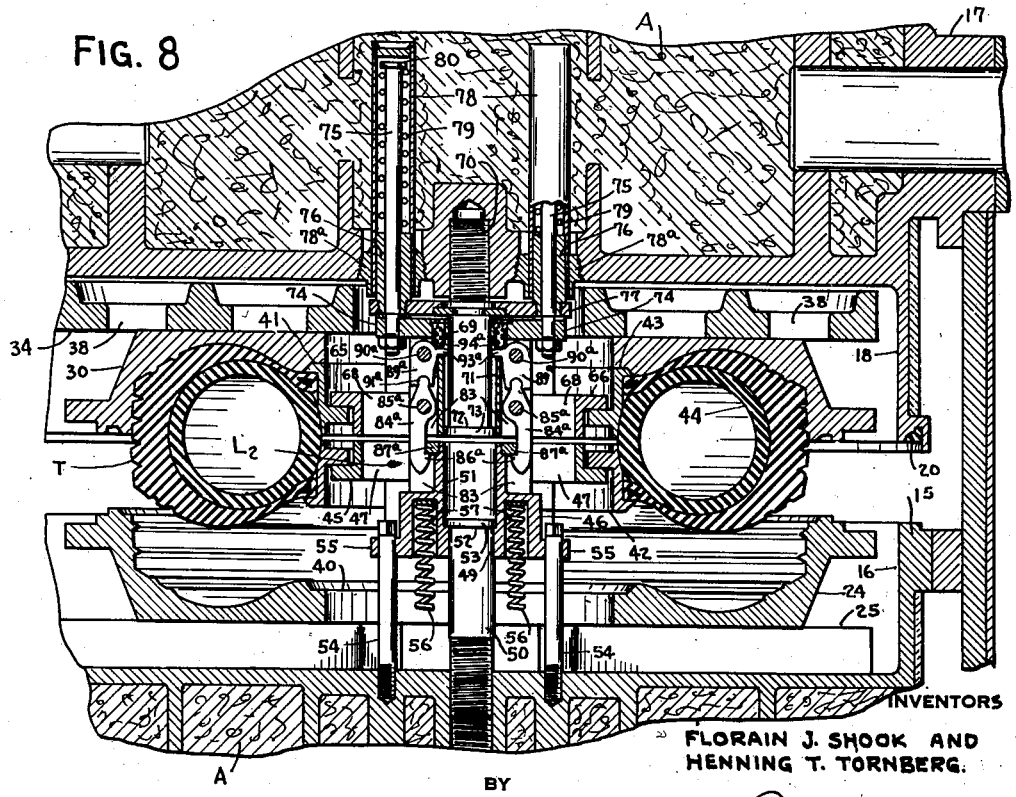

Figures 11 and 12 are views corresponding to Figures 7 and 8, respectively, which when considered in conjunction with Figures 2, 3, 9 and 10, illustrate the operation of the tire-stripping mechanisms when the adhesion between the surfaces of the tire and the upper mold section is broken prior to the breaking of the adhesion to the lower mold section.

Figure 13 is an enlarged detail plan view, partly broken away, illustrating the lower ejector ring assembly.

Figure 14 is an edge view, partly broken away and in section, of the lower ejector ring assembly as viewed from the left of Figure 13.

Figure 1:
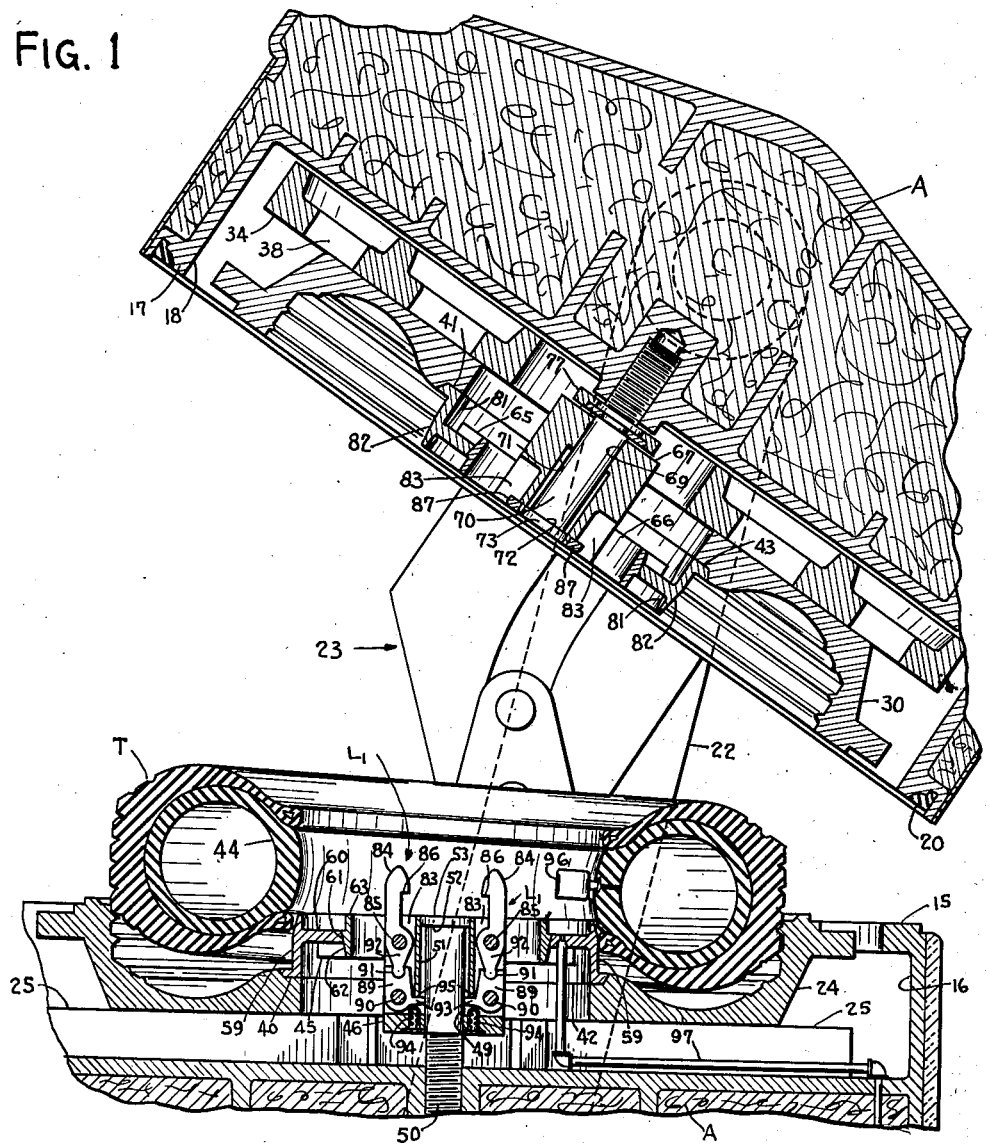
Figure 1 is a vertical cross-section, partly broken away, of a vulcanizing press with the press members in open position and having the improved tire-stripping mechanisms embodying the invention incorporated therein.

Referring in particular to Figure 1 of the drawings, the numeral 15 designates a lower press member which may be fixed and which may have a recess 16 in the face thereof. Arranged above press member 15, to be moved toward and from superposed registering relation therewith, is an upper press member 17 having a recess 18 on the face thereof, whereby members 15 and 17 form a closed chamber 19 when the press members are in registry. A gasket 20 on the inner face of member 17 may be arranged to engage the registering face of member 15 to insure fluid-tight seal for chamber 19. Press members 15 and 17 preferably are insulated, as indicated at A, A, with heat-insulating material of known type.

The mechanism for opening and closing the press is of a type such as is shown and described in copending application, Serial No. 300,399, filed October 20, 1939. This in general may include movable side arms 22 for pivotally supporting upper press member 17, means (not shown) for operating arms 22 to move member 17 toward and from registry with lower press member 15, and guide means, indicated generally at 23 for normally causing member 17 to move from and toward member 15 in parallelism and to cause member 17 to tilt on arms 22 out of parallelism, as the arms swing rearwardly of the press to the fully open position of the press members.

As best shown in Figures 2, 3, 4, 5 and 6, a lower mold section 24 is supported on a plurality of radially disposed spacer blocks 25, 25, secured to press member 15 at the bottom of recess 16. Mold section 24 is removably and replaceably secured to the spacers 25 by means of bolts 26, 26, received through grooves 27ª in lugs 27 on the mold section and radial slots 25ª in the top faces of the spacers. The heads 28 of the bolts engage the tops of the lugs 27, and nuts 29 threaded on the other ends of the bolts engage under shoulder portions along opposite edges of the slots 25ª.

An upper mold section 30 is removably and replaceably secured to upper press member 17, for registry with mold section 24 by means of bolts 31 similar to bolts 26 engaging between lugs 32 on mold section 30 and shoulder portions along opposite edges of radial slots 33 in a circular plate 34, the latter being secured for vertical adjustment to press member 17. For adjustably securing plate 34 in spaced relation to the inner face of press member 17, sleeves 35 threaded through the member have bolts extending therethrough and threaded into the top face of the plate to clamp the plate against the bottom faces of the sleeves. A packing gland 36 prevents leakage of fluid-heating medium from chamber 19 between sleeve 35 and press member 17, and a gasket 37 on the bottom face of the sleeve prevents such leakage through the bolt hole. Openings 38 are provided in plate 34 for effective circulation of the heating medium to the top of mold section 30.

While the improved stripping mechanism to be described is illustrated in a press such as that disclosed in the preceding paragraphs, it is to be understood that this mechanism may be used in presses of different designs, the stripping mechanism being self-actuated by relative movement of the press members in opening of the press after a vulcanizing operation.

Referring particularly to Figures 2, 3, 4 and 5, the lower and upper mold sections 24 and 30 may have annular seats 40 and 41 for receiving a pair of registering ejector rings 42 and 43, respectively, the ejector rings when in registry being adapted to embrace the bead portions of a tire T having the usual pressure bag 44 therein.

The lower ejector ring 42 may be fixed on a spider 45 having a hub 46 and spokes or ribs 47, 47, to form an ejector ring assembly, as shown in Figures 4, 13 and 14. The hub 46 has a central aperture 49 slidably to receive therein guide member comprising a pin 50 threaded in member 15, and the aperture is enlarged at 51 to provide a shoulder portion 52 for abutment by a head 53 on pin 50, to limit relative movement of the spider carrying ejector ring 42 (see Figure 3), as will be subsequently described. A pair of guide pins 54, 54, threaded in member 15 on opposite sides of pin 50, may be slidably received through apertured lugs 55, 55 on hub 46. Compression springs 56, 56 may be arranged to engage between press member 15 and the upper ends of bores 57, 57 in hub 46 to act as shock absorbers when the ejector ring drops by gravity into seating relation in seat 40 in the lower mold section, during a tire-stripping operation or when the press is operated without a tire in it, for example.

The ejector ring 42 may be formed in two segments 42ª, 42ª, to provide recesses 58, 58 at diametrically opposite points, opposite sides of the recesses being tapered for receiving correspondingly tapered segments 59, 59, fixed to mold member 15 when the ejector ring 42 is seated, these latter segments preferably having the same cross-sectional shape as the segments 42ª. Inwardly extending flanges 60 on segments 59 have tapered inner faces 61 for engaging correspondingly tapered faces 62 on an annular rim 63 of spider 45. The segments 42ª may be secured to the spider 45 by means of bolts 42ᵇ, 42ᵇ received through slots 42ᶜ, 42ᶜ, in flanges 42ᵈ of the segments, and threaded into an annular flange 45ª on the spider 45 (see Figures 13 and 14). The slots 42ᶜ permit slight radial movement of segments 42ª relative to the spider. The arrangement is such that as the ejector ring 42 is urged toward mold section 24 upon closing the press, the fixed wedge-like segments 59 expand segments 42ª tightly to urge the ejector ring into seat 40 and to grip the bead portions of tire T. Conversely, as the ejector ring 42 is urged away from mold section 24, thereby withdrawing segments 59 from recesses 58, the segments 42ª are permitted to shift or contract inwardly to loosen the tight engagement thereof in seat 40 and also to loosen the grip of the ejector ring on a tire being vulcanized.

Upper ejector ring 43 may be fixed on a spider 65, similar to spider 45, having an annular rim 66 and hub 67 connected by ribs or spokes 68, 68 (see Figure 5). A central aperture 69 is provided in hub 67 for receiving a guide member comprising a pin 70 threaded in upper member 17, the aperture being enlarged at 71, as before, to provide a shoulder 72 for abutment by a head 73 on the pin to limit downward movement of the spider and ejector ring 43. Hub 67 may have integral lugs 74, 74, on opposite sides of pin 70, to which are secured upwardly extending rods 75, 75, the latter being slidably received through sleeves 76, 76, threaded into a yoke 77 secured against relative axial movement on pin 70. The sleeves 76 are received in the lower ends of a pair of hollow cylinders 78, 78, extending upwardly through member 17 to enclose rods 75, these cylinders being secured to press member 17 by means of enlarged portions 78ª, 78ª, on the lower ends of the cylinders threaded into the press member. Pin 70, carrying yoke 77, being axially adjustable relative to member 17, cylinders 78 preferably are separately adjustable in the press member to suit said adjustment of the pin. Compression springs 79, 79, extended between enlarged ends 80, 80, on rods 75 normally yieldably urge the spider 66 upwardly to seat ejector ring 43 in the seat 41. Ejector ring 43 may be expansible and collapsible in the manner of lower ejector ring 42, recessed portions 81, 81, for that purpose, being disposed diametrically oppositely to each other for receiving a pair of wedging segments 82, 82, secured to upper mold section.

By means of latching mechanisms $L_1$ and $L_2$, carried by the lower and upper ejector-ring assemblies, respectively, the ejector rings 42 and 43 are locked together as a unit when the mold is closed and upon opening the mold this unit is automatically actuated completely to strip a tire T from both lower and upper mold sections, regardless of the order in which the tire releases from the respective sections by breaking of the adhesions between the surfaces of the tire and the mold sections.

The lower latching mechanism $L_1$ is best shown in latched position in Figures 2 and 4. Hub 46 of the lower spider is slotted at 83, 83 to receive a pair of oppositely disposed latches 84, 84 pivoted at 85, 85 and extending upwardly to engage hooked portions 86, 86 thereof over the top edges of latch bars or keepers 87, 87 secured across slots 88 in hub 67 of the upper spider. Also received in the slots 83 may be trip links 89, 89 pivoted at 90, 90 and having notches 91 on the end thereof for receiving rounded ends of projections 92 on the latches 84. Links 89 have fingers 93 extending inwardly into the path of head 53 of pin 50, spring-pressed detents 94, 94, mounted in the hub normally urging fingers 93 against abutments 95, 95, formed integral with the hub. The arrangement of this tire-stripping mechanism is such that when the press members are closed (see Figure 2), the fingers 93 are urged by detents 94, as limited by abutments 95, to swing trip links 89 outwardly on the pivots 90, thereby urging latches 84 on pivots 85 toward hooked relation with the latch bars 87 on hub 67 of the upper spider.

The upper latching mechanism $L_2$, best shown in latched position in Figures 3 and 5, is essentially the same as the independently operable lower latching mechanism $L_1$, and for that reason like parts are given like numerals with a suffix "a" attached. The essential difference, of course, is that the latches 84$^a$, 84$^a$, pivoted on the hub 67 of upper spider 43, extend downwardly for engaging the hooked portions 86$^a$, 86$^a$, thereof under the bottom edges of latch bars or keepers 87$^a$, 87$^a$, on hub 46 of the lower spider.

It should be understood that upon opening a press of the type described, after a vulcanization cycle, the cured tire generally releases from one mold section before the other by breaking the adhesion between the tire and mold section. Unless the cavity of one mold section, however, is lubricated by means of soapstone solution, or the like, the order in which the tire will release from the respective mold sections cannot usually be predetermined. For the purpose of a brief description of latching mechanisms $L_1$ and $L_2$ let it be assumed that the tire T is first released from the lower mold section 24. In such case, during the initial upward movement of the upper press member 17, from the closed position of the press-members shown in Figures 2 and 3, the tire T adhering to upper mold section 30 retains ejector ring 43 in its seat and through latching mechanisms $L_1$ and $L_2$, on the upper and lower spiders 67 and 46, respectively, lower ejector ring 42 is retained in registry with the upper ejector ring, i. e., both rings are moved upwardly as a unit by adhesion of the tire to the upper mold section. When the press members reach the relative positions shown in Figures 7 and 8, the head 53 of pin 50 will have engaged fingers 93 against the action of yielding detents 94 to trip the latches 84 out of engagement with latch bar 87 on the upper spider (see Figure 7), the upper latches 84$^a$, however, remaining latched to the latch bar 87$^a$ on the lower spider to retain the ejector rings together in registry as a unit. As press member 17 continues upwardly in parallelism with press member 15, toward the relative position thereof shown in Figures 9 and 10, latches 84$^a$ engaging latch bars 87$^a$ restrain further upward movement of the ejector ring unit to break the adhesion between surface of the tire T and the upper mold section 30, the head 73 on pin 70 then engaging the fingers 93$^a$ of trip lever 89$^a$ against the action of yielding detents 94$^a$, to trip the upper latches 84$^a$, thereby releasing the latter from latch bar 87$^a$ on the lower spider (see Figure 10). As soon as latches 84$^a$ are released, latches 84 being already released, the lower spider, carrying ejector ring 42, will drop by gravity to its seat 40 in the lower mold section against the shock-absorbing action of springs 56, while the upper spider will be urged upwardly by the yielding action of springs 79 to seat the upper ejector ring 43 in its seat 41 in the upper mold section 30. When the press members are in the fully open position shown in Figure 1 the ejector rings will be fully seated as described, with the latches 84, 84$^a$ urged inwardly by the yielding detents 94 and 94$^a$, urging fingers 93, 93$^a$ against the abutments 95, 95$^a$. Upon closing the press for another curing cycle, rounded end portions of the latches will engage outer edges of the latch bars 87, 87$^a$ against the yielding action of the detents 94, 94$^a$ to guide the latches into hooked engagement with the respective latch bars, thereby setting the latching mechanisms $L_1$ and $L_2$ for a succeeding tire-stripping operation upon opening of the press.

Similarly, in the case where the tire T first releases from the upper mold section 30 during the initial upward movement of press member 17, from the closed position shown in Figures 2 and 3, the tire adhering to the lower mold section 24 retains ejector ring 42 seated in lower mold section 24, and through the latching mechanisms $L_1$ and $L_2$ retains the upper and lower ejector rings in registry as a unit. When the press members have reached the relative positions shown in Figures 11 and 12, corresponding to Figures 7 and 8, the head 73 of pin 70 will have engaged fingers 93$^a$, against the yielding action of detents 94$^a$, to trip latches 84$^a$ out of engagement with latch bar 87$^a$ on the lower spider (see Figure 12), the lower latches 84 remaining latched to latch bars 87 on the upper spider to retain ejector rings in registry as a unit. As the press member 17 moves toward the relative position shown in Figures 9 and 10, the latches 84 engaging bars 87 lift the unit with the lower ejector ring to break the adhesion between the surface of tire T and the lower mold section, the head 73 of pin 70 then engaging fingers 93$^a$ of a trip lever 89$^a$, against the yielding action of detents 94$^a$, to trip the upper latches 84$^a$ out of engagement with latch bars 87$^a$ on the lower spider (see Figure 9). As member 17 continues upwardly in parallelism, toward the relative positions of the press member shown in Figures 9 and 10, and thence toward the fully open position, both latches now being released, the upper and lower ejector rings will recede toward seating position in the respective mold sections as before described.

Referring particularly to Figure 2 a valve connection 96 of known type is carried on the valve stem of pressure bag 44 and is adapted to be engaged between the flanged portions 60 and 82$^a$ of one pair of the registering segments 59 and 82 on the lower and upper mold sections, respectively, when said segments are in registry. A conduit 97 threaded into the lower relatively fixed segment 59 communicates with connection 96 for supplying air or other pressure medium to pressure bag 44 at the start of the curing cycle. Conduit 97 may be connected to the automatic timing and control mechanism (not shown) for establishing pressure in bag 44 after the press is closed, and for evacuating the bag before the press begins to open.

In the operation of the press for a tire vulcanizing operation, while the press is in the open position shown in Figure 1, the operator places an uncured tire T, having a pressure bag 44 therein, in the lower mold section 24, the ejector rings and associated latching mechanisms $L_1$ and $L_2$ being withdrawn into the respective mold sections. After the operator has adjusted the connector 96 to communicate with conduit 97, he presses a "start" button (not shown) to start the operating mechanism (not shown) to close the press. The press-operating mechanism preferably is operable to move the upper press member 17 toward and from registry with the relatively fixed lower member 15 in parallelism and to tilt the upper member from and toward parallelism as the same is moved toward and from fully open position, as described in detail in the above mentioned copending application.

As the press members move into the closed position shown in Figures 2 and 3, the latches 84 and 84ᵃ of latching mechanisms L₁ and L₂ automatically engage over the bars 87 and 87ᵃ, respectively. At the same time the closing movement of upper press member 17 actuates a limit switch (not shown) to stop the press-operating mechanism, and initiates the automatic timing and control mechanism to start the curing cycle, during which pressure is established in pressure bag 44 and steam is admitted to chamber 19. Other operations including evacuation of the chamber 19 may be carried out at the beginning of the curing cycle.

Figure 9:
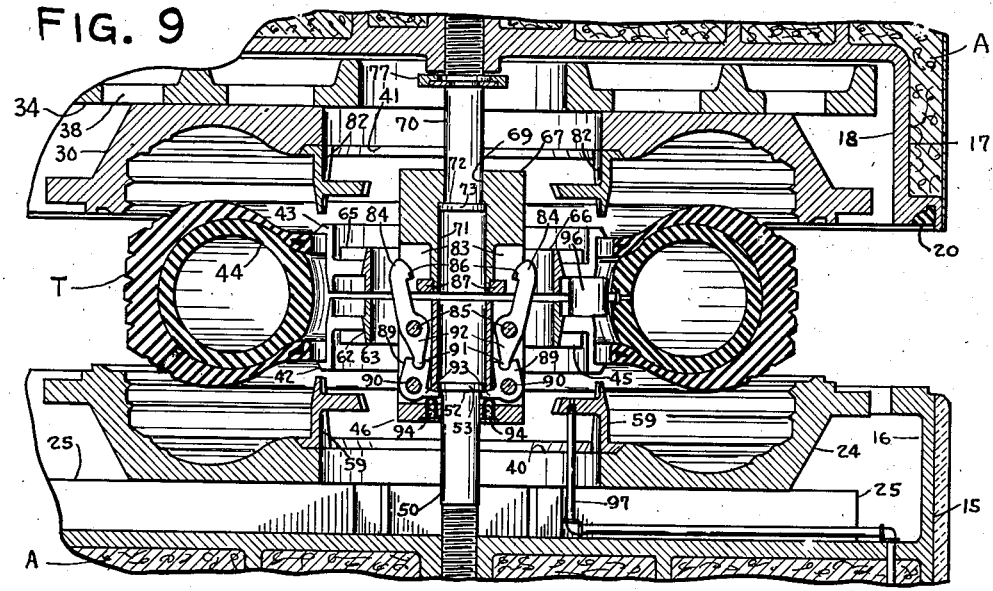
Figures 9 and 10 are views similar to Figures 2 and 3, respectively, illustrating the tire-stripping mechanisms operated to break the adhesion between the tire and both mold sections.
Figure 10:
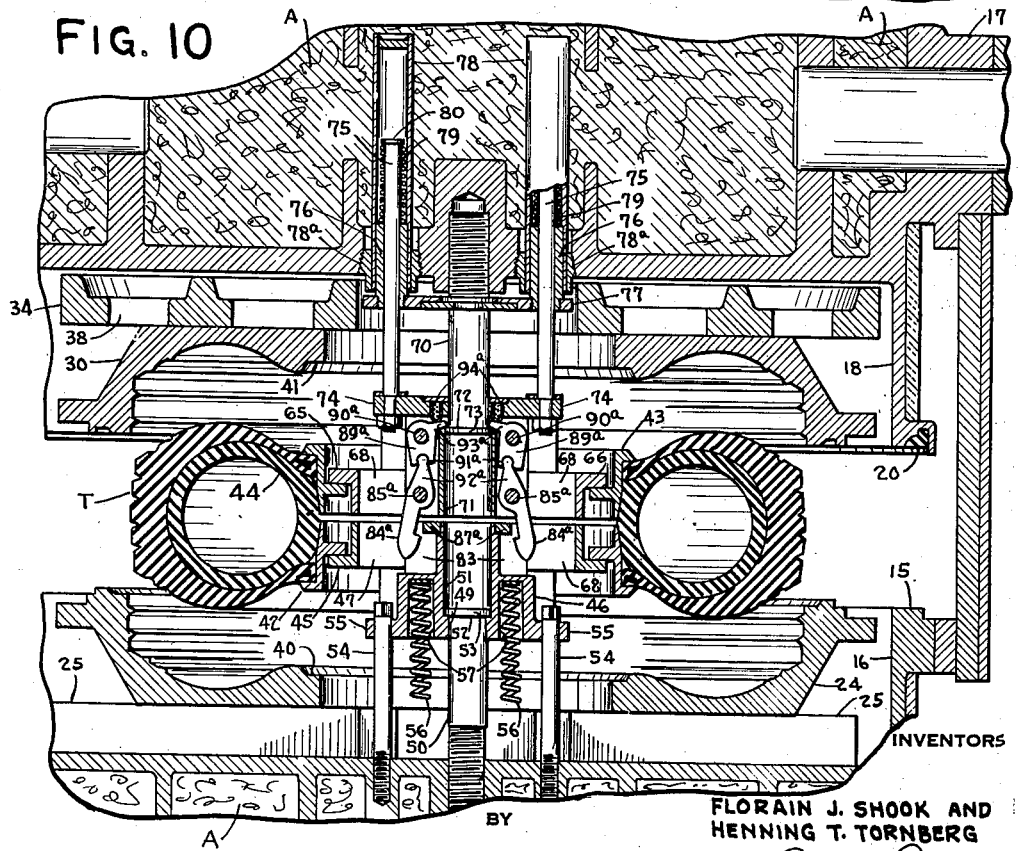

After a predetermined time the control mechanism causes the pressure in bag 44 to be released, evacuates the steam from chamber 19, and starts the press-operating mechanism to open the press. As described, in detail, in connection with the tire stripping mechanisms L₁ and L₂, as the mold sections initially separate, the adhesion between the surfaces of tire T and the mold sections may first be broken on the lower side, as shown in Figures 7 and 8, or on the upper side, as shown in Figures 11 and 12. In either case one of the latching mechanisms L₁ and L₂ will be released, while the other remains in locked engagement with the latch bar on the oppositely disposed spider, temporarily to retain the upper and lower ejector rings in registry as a unit, so that upon continued upward movement of press member 17 the adhesion is broken between tire T and the second mold section. When the tire is released from both mold sections the second latching mechanism is released, as shown in Figures 9 and 10, permitting the lower ejector ring 42 to drop by gravity into seating engagement with lower mold section 24 and upper ring 43 to be urged into seating engagement with upper mold section 30 by the springs 79. With the last named movements of the ejector rings the heads 53 and 73 on pins 50 and 70, respectively, become disengaged from the trip levers 89 and 89ᵃ, permitting the latches 84 and 84ᵃ to be urged into their seats in readiness for another cycle of operation of the press. Upper press member 17 in moving from the position thereof shown in Figures 9 and 10 may be tilted out of parallelism while moved rearwardly to the fully open position shown in Figure 1, a limit switch (not shown) being then actuated to stop the press-operating mechanism.

The tire-stripping apparatus in the foregoing manner is self-actuated to strip the cured tire from both mold sections 24 and 30, leaving the tire T loosely on the bottom of the lower mold section 24 (see Figure 1) from which the tire is readily removable. Because the apparatus operates effectively regardless of the order in which the tire releases from the respective mold sections, by breaking the adhesion between the surfaces of the tire and the mold sections, it is not necessary to lubricate either one or both of the mold cavities. It will be apparent of course that the adhesion to the two mold sections may be more or less simultaneously broken, the unit comprising the locked ejector rings moving as required until the stripping is completed. It should be noted that the stripping mechanisms L₁ and L₂ will function effectively without danger of jamming the press when the latter is opened or closed without a tire in it.

Modifications of the invention may be resorted to without departing from the spirit thereof or the scope of the appended claims.

What is claimed is:

1. In a vulcanizing press, relatively movable registering mold sections, a stripping element associated with each mold section and shiftable relatively to a face thereof, means for shiftably mounting said elements in association with the respective mold sections, releasable locking means operable by closing the mold for securing said stripping elements together as a unit, said unit being adapted to be yieldingly held in association with one mold section or the other or both by adhesion of an article thereto when the mold is being opened, means associated with the respective mold sections operable by relative movement thereof for relatively moving said unit as required first to strip an article from the mold sections in any order or sequence and then to release said locking means when the article has been released from both mold sections, and yieldable means for normally urging each stripping element toward its respective mold section.

2. In a vulcanizing press, registering superposed mold sections relatively movable toward and from each other in vertical direction, a stripping element, means for mounting said element in association with the upper mold section to be shiftable relative to a face thereof, releasable locking means operable by closing the mold for releasably restraining said stripping element with respect to the lower mold section, said stripping element being adapted to be releasably held in association with the upper mold section by adhesion of an article thereto when the mold is being opened, means associated with said upper mold section operable by opening movement of said mold sections after said adhesion is broken for limiting relative movement of said stripping element with respect to said upper mold section and for subsequently releasing said locking means, whereby said opening movement of said mold sections will relatively move said stripping element initially to strip the article from said upper section and then release said locking means, and means for normally urging said stripping element toward said first upper section.

3. In a vulcanizing press, relatively movable mold sections, a stripping element associated with each mold section and relatively shiftable thereon, means for shiftably mounting said elements in association with the respective mold sections, means for releasably locking each stripping element to the other stripping element when the mold is closed, means associated with each mold section for releasing each locking means and for limiting movement of each stripping element away from its mold section whereby when the mold is opened the stripping elements may move as a unit in either direction as required to strip the article from both mold sections until both of said locking means are released, and means normally urging each stripping element into association with its respective mold section.

4. In a vulcanizing press, relatively movable mold sections, a stripping element associated with each mold section and relatively shiftable thereon, means for shiftably mounting said elements in association with the respective mold sections, means for releasably locking each stripping element to the other stripping element when the mold is closed, and means associated with each mold section for releasing each locking means and for limiting movement of each stripping element with respect to its mold section whereby when the mold is opened the stripping elements may move as required to strip the article from both mold sections until both of said locking means are released.

5. In a tire vulcanizing press, relatively movable registering mold sections, annular stripping elements relatively shiftably mounted on each of said mold sections for embracing opposite bead portions of a tire in the mold, said stripping elements having latch keepers thereon, latch devices on each of said stripping elements engageable with a keeper on the other element and operable by closing the mold for locking each stripping element to the other as a unit, means associated with each mold section for limiting relative movement of its respective stripping element, and means associated with each of said stripping elements operable by said limiting means to release the respective latch devices, whereby upon opening of the mold said unit may move relative to the mold sections as required to strip a tire from both mold sections either simultaneously or in any sequence until said limiting means has released the latch devices of the respective stripping elements.

6. In an article vulcanizing press, relatively movable registering mold sections, stripping elements relatively shiftably mounted on each of said mold sections for engaging opposite portions of an article in the mold, said stripping elements having latch keepers thereon, latch devices on each of said stripping elements engageable with a keeper in the other element and operable by closing the mold for locking each stripping element to the other as a unit, means associated with each mold section for limiting relative movement of its respective stripping element, and means associated with each of said stripping elements operable by said limiting means to release the respective latch devices, whereby upon opening of the mold said unit may move relative to the mold sections as required to strip an article from both mold sections either simultaneously or in any sequence until said limiting means has released the latch devices of the respective stripping elements.

7. In a vulcanizing press, relatively movable registering mold sections, each section having a relatively shiftable element thereon for stripping an article from the mold, means for shiftably mounting said elements in association with the respective mold sections, means operable by closing the mold for releasably locking said shiftable elements to each other as a unit, and means associated with each mold section for limiting relative movement of its shiftable element, each of said limiting means having portions engageable with said locking means for releasing the same when both of said elements have been shifted to spaced relation from the respective mold sections, whereby upon opening of the mold said unit may move relative to the mold sections as required to strip an article from both mold sections either simultaneously or in any sequence.

8. In a tire vulcanizing press, relatively movable registering mold section, annular stripping elements relatively shiftably mounted on each of said mold sections for embracing opposite bead portions of a tire in the mold, means operable by closing the mold for releasably locking each stripping element to the other as a unit, means associated with each mold section for limiting relative movement of its stripping element, means operated by movement of both stripping elements moving to spaced relation from their respective mold sections for releasing the locking means thereof, whereby upon opening of the mold said unit may move relative to the mold sections as required to strip a tire from both mold sections either simultaneously or in any sequence until said locking means has been released by said releasing means, and yieldable means for normally urging each stripping element toward its respective mold section.

9. In a tire or like vulcanizing press, relatively movable registering mold members, a yieldingly expansible tire-stripping ring having one or more key segments therein, and means for mounting said ring to be shiftable relatively of one of said mold members, said key segment or segments being relatively fixedly mounted on said one mold member and being engageable with the ring yieldingly to expand the same, means operable by opening and closing said mold sections for shifting said ring from and toward said one mold member to strip a tire therefrom, said key segment or segments thereby being engageable with said ring yieldingly to expand the same upon closing the mold to shift the ring toward said one mold section.

10. A tire vulcanizing press as in claim 9, the interengaging portions of said ring and said key segment or segments being complementally tapered.

11. In a tire or like vulcanizing press, relatively movable registering mold members, a yieldingly expansible tire-stripping ring in association with each mold member, each ring having one or more key segments therein, and means for mounting said rings to be shiftable relatively of its mold member, said key segment or segments being relatively fixedly mounted on said mold members and being engageable with the rings yieldingly to expand the same, means operable by opening movement of said mold sections for shifting said rings relatively of the mold members to strip a tire therefrom, said key segments being engageable with said rings yieldingly to expand the same upon closing the mold to move the rings toward said key segments thereof.

12. In a vulcanizing or like press, a pair of relatively movable registering mold sections, a stripping element, a guide member on a first of said mold sections, said stripping element being mounted on said guide member to be shiftable toward and from spaced relation to the registering face of said first mold section, stop means on said guide member and said stripping element for stopping movement of the latter away from said first mold section at a predetermined position, releasable locking means operable by moving the mold sections into registry for releasably restraining said stripping element with respect to the other of said mold sections, said stripping element being adapted to be restrained with respect to said first mold section by adhesion of an article thereto upon opening the mold, the movement of the mold sections apart through said locking means shifting said stripping element away from said first mold section to strip the article therefrom, and means on said stripping element operable by said stop means at said predetermined position for releasing said locking means.

13. In a vulcanizing or like press, a pair of relatively movable registering mold sections, a stripping element, a guide member on a first of said mold sections, said stripping element being mounted on said guide member to be shiftable toward and from spaced relation to the registering face of said first mold section, stop means on said guide member and said stripping element for stopping movement of the latter away from said first mold section at a predetermined position, releasable locking means operable by moving the mold sections into registry for releasably restraining said stripping element with respect to the other of said mold sections, said stripping element being adapted to be restrained with respect to said first mold section by adhesion of an article thereto upon opening the mold, the movement of the mold sections apart through said locking means shifting said stripping element away from said first mold section to strip the article therefrom, means on said stripping element operable by said stop means at said predetermined position for releasing said locking means, and yieldable means for normally urging said stripping element toward said first mold section.

14. In a vulcanizing or like press, a pair of relatively movable registering mold sections, a guide member extending inwardly of the registering face of a first of said mold sections and having a shoulder portion thereon, a stripping element mounted on said guide member to be shiftable toward and from spaced relation to said first mold section, means on said stripping element engageable with said shoulder portion for stopping movement of said stripping element away from said first mold section at a predetermined postion, releasable locking means operable by moving the mold sections into registry for releasably restraining said stripping element with respect to the other of said mold sections, said stripping element being adapted to be restrained with respect to said first mold section by adhesion of an article thereto upon opening the mold, the movement of the mold sections apart through said locking means shifting said strpping element away from said first mold section to strip the article therefrom, and means on said stripping element engageable with said shoulder portion at said predetermined position of the stripping element for releasing said locking means.

15. In a vulcanizing press, a pair of relatively movable registering mold sections, a stripping element associated with each mold section, means for mounting said stripping elements to be shiftable relatively of the inner face of the respective mold sections, separate releasable locking means independently operable by closing the mold for securing said stripping elements together as a unit, said unit being adapted to be yieldingly held in association with one mold section or the other or to both by adhesion of an article thereto upon opening the mold, stop means associated with each of the mold sections for stopping movement of its stripping element at a predetermined position, and means independently operable by movement of said unit toward said predetermined positions of the stripping elements relative to the respective mold sections for releasing the respective locking means, whereby said unit is movable to strip an article from the mold sections in any order or sequence.

16. In a tire vulcanizing press, relatively movable registering mold sections, annular stripping elements relatively shiftably mounted on each of said mold sections for embracing opposite bead portions of a tire in the mold, separate means independently operable by closing the mold for releasably locking the stripping elements together as a unit, stop means associated with each mold section for limiting relative movement of its stripping element and thereby being adapted to restrain relative movement of said unit, and means on said stripping elements independently operable by the stop means for releasing the respective locking means, whereby upon opening of the mold said unit may move relative to the mold sections in any order or sequence as required to strip a tire from both mold sections.

FLORAIN J. SHOOK.
HENNING T. TORNBERG.